United States Patent Office 2,928,829
Patented Mar. 15, 1960

2,928,829
ALKYLENEIMINO-LOWER ALKYL-GUANIDINES

Robert Paul Mull, Florham Park, N.J., assignor to Ciba Pharmaceutical Products, Inc., Summit, N.J., a corporation of New Jersey No Drawing. Application August 31, 1959
Serial No. 836,932

10 Claims. (Cl. 260—239)

The present invention concerns guanidine compounds. More particularly, it relates to (N,N-alkyleneimino)-lower alkyl-guanidines, in which alkyleneimino contains from four to ten carbon atoms as ring members, and their acid addition salts, as well as quaternary ammonium compounds thereof and process for their manufacture. The present invention is especially directed to compounds of the formula:

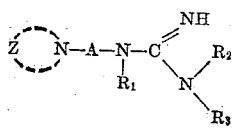

in which

represents an N,N-alkyleneimino ring, containing from four to ten carbon atoms as ring members, A stands for an alkylene radical containing from one to seven carbon atoms, $R_1$ stands for hydrogen or lower alkyl, $R_2$ stands for hydrogen, lower alkyl or the acyl radical of an organic carboxylic acid and $R_3$ for hydrogen or lower alkyl, and therapeutically acceptable acid addition salts thereof.

The N,N-alkyleneimino ring

contains from four to ten, preferably from five to eight, carbon atoms as ring members and is represented, for example, by
N,N-tetramethyleneimino (1-pyrrolidino),
N,N-pentamethyleneimino (1-piperidino),
N,N-hexamethyleneimino (1-hexahydroazepino),
N,N-heptamethyleneimino (1-octahydroazocino),
N,N-octamethyleneimino (1-octahydroazonino),
N,N-nonamethyleneimino (1-decahydroazecino) or
N,N-decamethyleneimino groups. These groups are preferably unsubstituted or may contain lower aliphatic hydrocarbon, such as lower alkyl, e.g. methyl, ethyl, n-propyl, isopropyl and the like, radicals as substituents.

The lower alkylene radical A, linking the N,N-alkyleneimino nucleus with the guanidino group, contains from one to seven, preferably from two to three, carbon atoms, which may be arranged in a straight or branched chain. Such lower alkylene radicals are particularly 1,2-ethylene, 1-methyl-1,2-ethylene, 2-methyl-1,2-ethylene, and 1,3-propylene, but may also be represented by methylene, 1,4-butylene, 1,3-butylene, 2,3-butylene, 1,5-pentylene, 1,4-pentylene and the like.

The group $R_1$ represents primarily hydrogen; when standing for lower alkyl containing from one to seven carbon atoms, it represents methyl, ethyl, n-propyl, isopropyl, n-butyl and the like.

$R_2$ stands particularly for hydrogen. A lower alkyl group $R_2$ contains from one to seven carbon atoms and stands especially for methyl, ethyl, n-propyl, isopropyl, n-butyl and the like.

$R_2$ may also stand for the acyl radical of an organic carboxylic acid. Such carboxylic acids are, for example, lower aliphatic carboxylic acids, such as lower alkane monocarboxylic acids, lower alkane dicarboxylic acids, lower alkane tricarboxylic acids, lower alkene monocarboxylic acids, lower alkene dicarboxylic acids, lower cycloalkane monocarboxylic acids, lower cycloalkene dicarboxylic acids, lower cycloalkyl-lower alkane carboxylic acids and the like, which acids may contain lower aliphatic hydrocarbon radicals, such as lower alkyl; e.g. methyl, ethyl and the like, or functional groups as substituents, such as hydroxyl, lower alkoxy, e.g. methoxy, ethoxy and the like, aryloxy, such as monocyclic carbocyclic aryloxy, e.g. phenyloxy and the like, acyloxy, such as lower alkanoyloxy, e.g. acetyloxy, propionyloxy and the like, or lower alkoxy-carbonyloxy, e.g. ethoxycarbonyloxy and the like, lower alkyl mercapto, e.g. methyl mercapto and the like, acyl, such as lower alkanoyl, e.g. acetyl, propionyl and the like, amino, such as primary amino or tertiary amino, particularly N,N-di-lower alkyl-amino, e.g. dimethylamino or diethylamino and the like, or halogen, e.g. fluorine, chlorine or bromine and the like. Other acyl radicals are those of carbocyclic aryl carboxylic acids, such as, monocyclic carbocyclic aryl monocarboxylic acids, monocyclic carbocyclic aryl dicarboxylic acids, bicyclic carbocyclic aryl monocarboxylic acids and the like, which acids may contain lower alkyl, e.g. methyl, ethyl and the like, or functional groups as substituents, such as, for example, hydroxyl, lower alkoxy, e.g. methoxy, ethoxy and the like, lower alkylenedioxy, e.g. methylenedioxy, acyloxy, such as lower alkanoyloxy, e.g. acetyloxy, propionyloxy and the like, or lower alkoxy-carbonyloxy, e.g. ethoxycarbonyloxy and the like, lower alkyl-mercapto, e.g. methylmercapto, ethylmercapto and the like, acyl, such as lower alkanoyl, e.g. acetyl, propionyl and the like, nitro, amino, such as primary amino or tertiary amino, for example, N,N-di-lower alkyl-amino, e.g. N,N-dimethylamino, N,N-diethylamino and the like, halogen, e.g. fluorine, chlorine, bromine and the like, or halogeno-lower alkyl, e.g. trifluoromethyl and the like. Acyl radicals may also be those of carbocyclic aryl-lower aliphatic carboxylic acids, such as, monocyclic carbocyclic aryl-lower alkane monocarboxylic acids, monocyclic carbocyclic aryl-lower alkene carboxylic acids, or bicyclic carbocyclic aryl-lower alkane monocarboxylic acids and the like, which may contain additional substituents, such as those mentioned hereinbefore as being present in carbocyclic aryl carboxylic acids, heterocyclic aryl carboxylic acids, particularly monocyclic azacyclic aryl monocarboxylic acids, monocyclic oxacyclic aryl monocarboxylic acids, monocyclic thiacyclic aryl carboxylic acids, bicyclic azacyclic aryl carboxylic acids and the like, which acids may contain as further substituents of the heterocyclic aryl nucleus lower alkyl, e.g. methyl, ethyl and the like, lower alkoxy, e.g. methoxy, ethoxy and the like, or halogen, e.g. fluorine, chlorine, bromine and the like, or heterocyclic aryl lower aliphatic carboxylic acids, particularly monocyclic azacyclic aryl-lower alkane monocarboxylic acids, monocyclic oxacyclic aryl-lower alkane monocarboxylic acids or monocyclic thiacyclic aryl-lower alkane monocarbocyclic acids and the like, in which the heterocyclic nucleus may contain additional substituents, such as those mentioned hereinbefore as being present in the heterocyclic nucleus of heterocyclic aryl carboxylic acids.

$R_2$ may, therefore, be represented by the acyl radical of acids, such as, for example, formic, acetic, propionic, butyric, isobutyric, trimethylacetic, hexahydrobenzoic, tetrahydrophthalic, cyclopentylpropionic, acrylic, methylacrylic, crotonic, isocrotonic, angelic, tiglic, tetrolic, lactic, ethoxycarbonic, pyruvic, methoxyacetic, phenoxyacetic, dimethylaminoacetic, acetoacetic, shikimic, prephenic, dichloroacetic, trifluoroacetic, bromoacetic, malonic, succinic, glutaric, glutamic, malic, fumaric, maleic, tartaric, citric, benzoic, m-toluic, p-toluic, 3,4,5-trimethyl-benzoic, 4-hydroxy-benzoic, 3,4-dihydroxy-benzoic, 2,5-dihydroxybenzoic, 4-methoxy-benzoic, 3,4-dimethoxy-benzoic, 3,4,5-trimethoxy-benzoic, 4-ethoxy-benzoic, 3,4,5-triethoxybenzoic, vanillic, syringic, piperonylic, 4-acetoxy-benzoic, 4-O-ethoxy-carbonyl-vanillic, O - methoxycarbonyl-syringic, O-ethoxycarbonyl-syringic, 3-amino-benzoic, 4-amino-benzoic, 3-dimethylamino-benzoic, 4-dimethylamino-benzoic, 4-chloro-benzoic, 3,4-dichloro-benzoic, 4-methylmercapto-benzoic, phthalic, isophthalic, terephthalic, 1-methoxy-2-naphthoic, 1-ethoxycarbonyloxy - 2 - naphthoic, phenylacetic, 4-methoxyphenyl - acetic, 3,4,5 - trimethoxyphenylacetic, diphenylacetic, 2-methoxy-2-phenyl-acetic, 2-ethoxycarbonyloxy-2-phenyl-acetic, 3 - phenyl - propionic, 3 - phenyl - propionic, 3 - (3,4,5 - trimethoxyphenyl)-propionic, cinnamic, 4-methoxy-cinnamic, 3,4,5-trimethoxycinnamic, ferulic, O-ethoxycarbonyl-ferulic, nicotinic, isonicotinic, 2-thienoic, 2-furoic, 6-quinolyl-carboxylic acid, 3-pyridyl-acetic, 4-pyridyl-acetic or 2-thienyl-acetic acid and the like. Particularly anticipated as acyl groups of carboxylic acids representing the radical $R_2$ are those of lower alkane carboxylic acids, benzoic acid and methoxy-substituted benzoic acids and the like.

The group $R_3$ stands primarily for hydrogen; it may also represent lower alkyl, such as methyl, ethyl, n-propyl, isopropyl and the like.

Salts of the compounds of this invention are primarily therapeutically acceptable acid addition salts with inorganic or organic acids. Suitable inorganic acids are, for example, mineral acids, such as hydrohalic acids, e.g. hydrochloric or hydrobromic acid, or sulfuric or phosphoric acids. Organic acids are, for example, lower aliphatic hydrocarbon monocarboxylic acids, e.g. formic, acetic, propionic or pivalic acid and the like, lower aliphatic hydroxy-hydrocarbon monocarboxylic acids, e.g. glycolic or lactic acid and the like, lower aliphatic lower alkoxy-hydrocarbon monocarboxylic acids, e.g. methoxy-acetic or ethoxy-acetic acids and the like, lower aliphatic lower alkanoyl-hydrocarbon monocarboxylic acids, e.g. pyruvic acid and the like, lower aliphatic halogeno-hydrocarbon monocarboxylic acids, e.g. chloroacetic, dichloroacetic, trichloroacetic acid or bromoacetic acid and the like, lower aliphatic hydrocarbon dicarboxylic acids, e.g. oxalic, malonic, succinic, methylsuccinic, dimethyl-succinic, glutaric, α-methylglutaric, α,α-dimethylglutaric, β-methylglutaric, itaconic, homoitaconic, maleic, citraconic, homocitraconic, pyrocinchonic, xeronic or fumaric acid and the like, lower aliphatic hydroxy-hydrocarbon discarboxylic acids, e.g. malic or tartaric acid and the like, lower aliphatic lower alkoxy-hydrocarbon dicarboxylic acids, e.g. α,β-dimethoxysuccinic or ethoxymaleic acid and the like, lower aliphatic halogeno-hydrocarbon dicarboxylic acids, e.g. chlorosuccinic or bromosuccinic acid and the like, lower aliphatic hydrocarbon-tricarboxylic acids, e.g. aconitic or tricarballylic acid and the like, lower aliphatic hydroxy-hydrocarbon tricarboxylic acids, e.g. citric acid and the like, monocyclic or bicyclic carboxylic aryl-carboxylic or carbocyclic aryl-lower aliphatic carboxylic acids, e.g. benzoic, cinnamic, mandelic, salicylic, 4-aminosalicylic, 2-phenoxy-benzoic or 2-acetoxybenzoic acid and the like, or monocyclic or bicyclic carbocyclic aryl-dicarboxylic acids, e.g. phthalic acid and the like. Furthermore, amino acids, e.g. methionine, trytophane, lysine, arginine, aspartic, glutamic or hydroxy-glutamic acid and the like, or organic sulfonic acids, such as lower alkane sulfonic acids, e.g. methane sulfonic or ethane sulfonic acid and the like, or lower hydroxy-alkane sulfonic acids, e.g. 2-hydroxy-ethane sulfonic acid and the like, may be suitable. Particularly useful are therapeutically acceptable salts with mineral acids; salts with organic acids are primarily those with lower aliphatic hydrocarbon dicarboxylic acids and lower aliphatic hydroxy-hydrocarbon dicarboxylic acids, especially lower alkene dicarboxylic acids, e.g. maleic or citraconic acid and the like, lower hydroxy-alkane dicarboxylic acid, e.g. malic or tartaric acid and the like, lower hydroxy-alkene dicarboxylic acids, e.g. hydroxymaleic or dihydroxymaleic acid and the like, or lower hydroxy-alkane tricarboxylic acid, e.g. citric acid and the like.

The new guanidine derivatives of this invention and their salts have antihypertensive properties and can be used as antihypertensive agents to relieve hypertensive conditions, such as, for example, neurogenic or renal hypertension. A particular characteristic of these guanidine compounds is their long-lasting effect, which property is especially desirable in the treatment of chronic hypertensive states. Outstanding and long-lasting antihypertensive effects are shown by compounds of the formula:

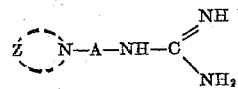

in which

represents N,N-alkyleneimino, the alkylene portion of which contains from five to eight, preferably seven, carbon atoms, and A stands for a lower alkylene radical, which contains from two to three carbon atoms and separates the N,N-alkyleneimino portion from the guanidino group by two to three carbon atoms, as well as their salts with therapeutically acceptable inorganic acids, such as mineral acids, e.g. hydrochloric, hydrobromic, phosphoric, or especially sulfuric acids. This group is represented by the (1-N,N-heptamethyleneimino)-lower alkyl-guanidines, which may also be designated as the (1-octahydroazocinyl)-lower alkyl-guanidines, in which lower alkyl contains from two to three carbon atoms and separates the N,N-heptamethyleneimino portion from the guanidino group by two to three carbon atoms, particularly by the compund of the formula:

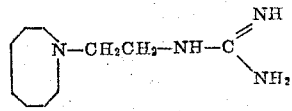

and their therapeutically useful inorganic acid addition salts, particularly their sulfates. Good antihypertensive effects are also exhibited by the (N,N-alkyleneimino)-lower alkyl-guanidines, in which the N,N-alkyleneimino portion contains from five to eight, preferably seven, ring carbon atoms, lower alkyl has from two to three carbon atoms separating the N,N-alkyleneimino portion from the guanidino group by two to three carbon atoms, and the guanidino group is substituted by $R_2$ representing the acyl radical of lower alkane carboxylic acids, benzoic acid or methoxy-substituted benzoic acids.

The new guanidine derivatives may be used as medicaments in the form of pharmaceutical preparations, which contain the new compounds or the salts thereof in admixture with a pharmaceutical organic or inorganic, solid or liquid carrier suitable for enteral, e.g. oral, or parenteral administration. For making up the preparations there can be employed substances which do not react with the new compounds, such as water, gelatine, lactose, starches, stearyl alcohol, stearic acid, magnesium stearate, talc, vegetable oils, benzyl alcohols, gums, propylene glycol, polyalkylene glycols, petroleum jelly or any other known carrier for medicaments. The pharmaceutical preparations may be in solid form, for example, as tablets, dragees or capsules, or in liquid form, for example as solutions, suspensions or emulsions. If desired, they may contain auxiliary substances, such as preserving agents, stabilizing agents, wetting agents or emulsifying agents, salts for varying the osmotic pressure or buffers and the like. They may also contain, in combination, other therapeutically useful substances.

The new guanidine compounds may be prepared, for example, by reacting an (N,N-alkyleneimino)-lower alkyl-amine, in which the N,N-alkyleneimino and the lower alkyl radical have the previously-given meaning, or a salt thereof, with a reagent capable of converting the amino group in the starting material to a guanidino group, and, if desired, converting a resulting salt into the free compound, and/or, if desired, converting a free compound into a salt or a quaternary ammonium compound thereof.

The (N,N-alkyleneimino)-lower alkyl-amino used as the starting materials are known or, if new, may be prepared according to procedures used for the manufacture of the known compounds. The preferred (N,N-alkyleneimino)-lower alkyl-amines, may be depicted by the formula:

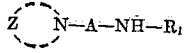

in which

A and $R_1$ have the previously-given meaning, and their acid addition salts with mineral acids. They may be obtained for example, by reacting an N,N-alkyleneimine with a cyano-lower alkyl-halide (e.g. chloride, bromide and the like) in the presence of an acid neutralizing agent, such as, for example, an alkali metal carbonate, e.g. sodium or potassium carbonate and the like, to form a (1-N,N-alkyleneimino)-lower alkane nitrile, which upon reduction, for example, by treatment with a hydride reducing reagent, such as an alkali metal aluminum hydride, e.g. lithium aluminum hydride, sodium aluminum hydride and the like, an alkaline earth metal aluminum hydride, e.g. magnesium aluminum hydride and the like, as well as aluminum borohydride or aluminum hydride, which hydride reducing reagents may be used, if desired, in the presence of an activating reagent, such as aluminum chloride, or by treatment with hydrogen in the presence of a catalyst containing a metal of the eighth group of the Periodic System, e.g. nickel, platinum and the like, are converted to the desired starting material. The cyano-lower alkyl halides may also be replaced by lower alkene nitriles, in which the double bond of the alkene portion is activated in such manner that the secondary amine, i.e. the N,N-alkylene-imine, adds to the double bond; such lower alkene nitriles are, for example, acrylonitrile compounds, e.g. acrylonitrile, and the like. Starting materials, in which $R_1$ represents lower alkyl, may be prepared somewhat differently. For example, the N,N-alkyleneimine may be reacted with a halogeno-lower alkanol, for example, a bromo-lower alkanol, e.g. 2-bromoethanol and the like, in the presence of an acid neutralizing reagent such as an alkali metal carbonate, e.g. sodium carbonate and the like. In a resulting (N,N-alkyleneimino)-lower alkanol, the hydroxyl group may be converted into a halogen, e.g. chlorine, atom, for example, by treatment with a thionyl halide, e.g. thionyl chloride, if desired, in the presence of an inert solvent, such as a monocyclic carbocyclic aryl hydrocarbon, e.g. benzene and the like. The (N,N-alkyleneimino)-lower alkyl halide or a salt thereof with a hydrohalic acid, particularly an (N,N-alkyleneimino)-lower alkyl chloride hydrochloride, is then reacted with a lower alkyl-amine, preferably in the presence of a solvent, such as a lower alkanol, e.g. ethanol and the like, and of an acid neutralizing reagent, particularly an alkali metal carbonate, e.g. potassium carbonate and the like. The lower alkyl-amine may be replaced by ammonia and the previously-described primary amino compounds are formed.

The preferred reagents capable of converting the amino group of the starting materials into a guanidino group are S-lower alkyl-isothioureas or O-lower alkyl-isoureas, or, preferably, their acid addition salts, particularly their salts with mineral acids, such as hydrohalic acids, e.g. hydrochloric or hydrobromic acid, or primarily with sulfuric acid. Lower alkyl represents, for example, methyl, ethyl, n-propyl, isopropyl and the like. These reagents may, therefore, have the formula:

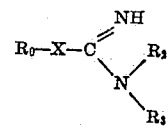

in which $R_2$ and $R_3$ have the previously-given meaning, X stands for sulfur or oxygen and $R_0$ represents lower alkyl, and acid addition salts thereof. The preferred reagents are sulfates of S-lower alkyl-isothioureas; S-methyl-isothiourea sulfate is especially useful to form guanidine compounds, which contain an unsubstituted guanidino group.

The (N,N-alkyleneimino)-lower alkyl-amine, which is advantageously used in the form of the free base, is contacted with the reagent, preferably in the presence of a solvent, the choice of which depends primarily on the solubility of the reactants. Water or water-miscible organic solvents, such as lower alkanols, e.g. methanol, ethanol, propanol, isopropanol, tertiary butanol and the like, cyclic ethers, e.g. tetrahydrofuran, p-dioxane and the like, ketones, e.g. acetone, ethyl methyl ketone and the like, lower alkanoic acids, e.g. acetic acid and the like, may be used as diluents. The reaction may be carried out at room temperature, or, if necessary, at an elevated temperature, for example, at the boiling temperature of the solvent, and, if desired, in the atmosphere of an inert gas, e.g. nitrogen.

The S-lower alkyl-isothioureas and O-lower alkyl-isoureas used in the above reaction are known, and may be prepared, for example, by alkylating thioureas or ureas, in which at least one of the nitrogen atoms carries a hydrogen atom, with a lower alkyl halide, e.g. methyl or ethyl chloride, bromide or iodide and the like, or with a bis-lower alkyl-sulfate, e.g. dimethyl sulfate or diethyl sulfate and the like.

Other reagents capable of transforming the amino-group of an (N,N-alkyleneimino)-lower alkyl-amine, in which N,N-alkyleneimino and lower alkyl have the previously-given meaning, particularly of an acid addition salt thereof, are cyanamides having the formula:

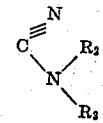

The reaction may be carried out, for example, by heating a mixture of the (N,N-alkyleneimino)-lower alkyl-amine, especially in the form of a salt thereof, particularly a mineral acid addition salt, such as the hydrochloride, hydrobromide or sulfate and the like, and the cyanamide. The resulting melt may then be dissolved in a solvent, such as a lower alkanoic acid, e.g. acetic acid, and the like and the desired product may be isolated, for example, by crystallization and the like. The reaction may be carried out in the absence or in the presence of a solvent; the salt of a free base used as the starting material may also be formed at the site of reaction by performing the latter in the presence of an acid, particularly a concentrated aqueous mineral acid, e.g. hydrochloric acid and the like. The reaction may proceed exothermically, and is maintained by heating, for example, to from about 80° to about 200°; an atmosphere of an inert gas, e.g. nitrogen may be advantageous.

A third modification of the procedure for the manufacture of the products of this invention comprises reacting the (N,N-alkyleneimino)-lower alkylamine, in which N,N-alkylene-imino and lower alkyl have the previously-given meaning, with a salt of a 1-guanyl-pyrazole. A salt of a 1-guanyl-pyrazole is primarily a salt with a mineral acid, such as, for example, nitric acid; a 1-guanyl-pyrazole may contain additional substituents in the pyrazole nucleus, particularly lower alkyl, e.g. methyl, ethyl and the like. 1-guanyl-3,-dimethyl-pyrazole salts, particularly the nitrate, represents a preferred reagent. The reaction may be carried out in the absence of a solvent, for example, by fusing the two reactants, or in the presence of a diluent, such as, for example, a lower alkanol, e.g. ethanol and the like, and, advantageously, by excluding any carbon dioxide, for example, by performing the reaction in the atmosphere of an inert gas, e.g. nitrogen. The reaction mixture is preferably heated, for example, to the melting point of the mixture or to the boiling point of the solvent.

In the products obtained from the reaction, additional groups may be introduced or groups may be exchanged for other substituents. For example, the resulting guanidines, particularly those of the formula:

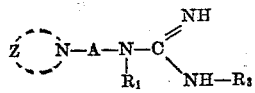

may be acylated to form compounds of the formula:

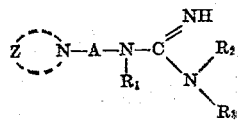

in which formulae

A, $R_1$ and $R_3$ have the previously-given meaning and $R_2$ represents an acyl radical. They may be obtained, for example, by treating the guanidine compound with the reactive derivative of a carboxylic acid, for example, with the halide, e.g. chloride, or the anhydride of a carboxylic acid. The reaction may be carried out in the presence of an inert solvent, for example, in a hydrocarbon, such as a lower alkane, e.g. hexane and the like, or a monocyclic carbocyclic aryl hydrocarbon, e.g. benzene, toluene or xylene and the like, or in a tertiary organic base, such as a liquid pyridine compound, e.g. pyridine or collidine and the like. Acylation may also be performed in the absence of a solvent, for example, by heating the guanidine compound or a salt thereof with the acylating reagent in a sealed tube.

The new guanidine compounds may be obtained in the form of the free compounds or as the salts thereof. A salt may be converted into the free compound in the customary way, for example, by treatment with a strong alkaline reagent, such as aqueous alkali metal hydroxide, e.g. lithium, sodium or potasisum hydroxide, or a strong quaternary ammonium anion (hydroxy ion) exchange resin and the like. A free base may be transformed into its therapeutically useful acid addition salts by reacting the latter with an appropriate inorganic or organic acid, such as one of those outlined hereinabove; such reaction may be carried out advantageously in a solvent, such as, for example, a lower alkanol, e.g. methanol, ethanol, propanol, isopropanol and the like, an ether, e.g. diethylether, p-dioxane and the like, a lower alkyl lower alkanoate, e.g. ethyl acetate and the like, a mixture of such solvents, and isolating the desired salt.

The new guanidine compounds of this invention may also form quaternary ammonium compounds, particularly those with lower alkyl halides, e.g. methyl, ethyl, n-propyl or isopropyl chloride bromide or iodide and the like, or with lower alkyl lower alkane sulfonates, e.g. methyl or ethyl methane or ethane sulfonate, and the like, as well as the corresponding quaternary ammonium hydroxides and the salts which may be formed from the quaternary ammonium hydroxides by the reaction with inorganic acids other than the hydrohalic acids or with organic acids, such as those outlined above for the preparation of the acid addition salts.

The quaternary ammonium compounds may be obtained by reacting a resulting free base with a lower alkyl halide, e.g. methyl, ethyl, n-propyl, isopropyl chloride, bromide or iodide and the like, or a lower alkyl lower alkane sulfonate, e.g. methyl or ethyl methane or ethane sulfonate and the like. The quaternizing reaction may be performed in the presence of a solvent, such as, for example, a lower alkanol, e.g. methanol, ethanol, propanol, isopropanol, tertiary butanol and the like, a lower alkanone, e.g. acetone, ethyl methyl ketone and the like, or an organic acid amide, e.g. formamide or dimethylformamide and the like. Resulting quaternary ammonium compounds may be converted into the corresponding quaternary ammonium hydroxides, for example, by reacting resulting quaternary ammonium halides with silver oxide, by treating quaternary ammonium sulfates with barium hydroxide, or quaternary ammonium salts with an anion exchanger, or by electrodialysis. From a resulting quaternary ammonium hydroxide there may be formed therapeutically suitable quaternary ammonium salts by treating the quaternary ammonium hydroxide with acids, for example, with those outlined hereinbefore as being useful for the preparation of acid addition salts.

The invention also comprises any modification of the general process wherein a compound obtainable as an intermediate at any stage of the process is used as starting material and the remaining step(s) of the process is (are) carried out, as well as any new intermediates.

In the process of this invention such starting materials are preferably used which lead to final products mentioned in the beginning as preferred embodiments of the invention.

This is a continuation-in-part application of my application Serial No. 741,020, filed June 10, 1958 (now abandoned).

The following examples illustrate the invention and are not to be construed as being limitations thereon. Temperatures are given in degrees centigrade.

*Example 1*

To a solution of 98 g. of 2-(1-N,N-heptamethyleneimino)-ethylamine in 300 ml. of water is added 87 g. of S-methyl-isothiourea sulfate, and the reaction mixture is then heated for eight hours. Upon cooling, the 2-(1-N,N-heptamethyleneimino)-ethyl-guanidine sulfate precipitates and is recrystallized from aqueous ethanol, M.P. 276–281° (decomposition); yield: 113.7 g.

A concentrated aqueous solution of the resulting salt may be treated with a strong quaternary ammonium (hydroxy ion) resin, and the free base may be obtained by evaporating the solvent. By adding a mixture of ethanol and ether, saturated with hydrogen chloride, to the free base the 2-(1-N,N-heptamethyleneimino)-ethyl-guanidine hydrochloride may be obtained.

The starting material used in the above reaction may be prepared as follows: To a solution of 73 g. of chloroacetonitrile in 500 ml. of benzene are added 51.5 g. of anhydrous sodium carbonate and a solution of 109.2 g. of N,N-heptamethyleneimine in 250 ml. of benzene. The reaction mixture is refluxed for four hours while stirring. After cooling, filtering and concentrating under reduced pressure, the oily residue is distilled to yield the colorless (1-N,N-heptamethyleneimino)-acetonitrile, B.P. 114–118°/14 mm.; yield: 127.5 g.

To a suspension of 44.5 g. of lithium aluminum hydride in 2,000 ml. of ether is added a solution of 127.5 g. of (1-N,N-heptamethyleneimino)-acetonitrile in 300 ml. of ether while cooling. After completion of the addition, the solution is refluxed for three hours and stirring is continued overnight. In succession, 40 ml. of water, 50 ml. of 20% aqueous sodium hydroxide and 125 ml. of water are added while cooling. The reaction mixture is filtered, the filtrate concentrated under reduced pressure and 2-(1-N,N-heptamethyleneimino)-ethylamine is distilled, B.P. 108–111°/14 mm.; yield: 115.7 g.

Example 2

To a solution of 5 g. of 3-(1-N,N-heptamethyleneimino)-propylamine in 10 ml. of water is added 4.1 g. of S-methyl-isothiourea sulfate, and the solution is heated on the steam bath for four hours. Vigorous evolution of methyl mercaptan is observed throughout the reaction period. The 3-(1-N,N-heptamethyleneimino)-propylguanidine sulfate precipitates, and is filtered off after cooling and recrystallized from a mixture of ethanol and ethyl ether and then from a mixture of ethanol and hexane, M.P. 248–252° (decomposition); yield: 6.3 g.

The starting material used in the above reaction may be prepared as follows: 14.3 g. of N,N-heptamethyleneimine is slowly added to 27.6 g. of acrylonitrile while stirring. The addition of 2 ml. of a 38 percent aqueous trimethylbenzylammonium hydroxide causes a vigorous reaction to occur; after it subsides, the reaction mixture is stirred at room temperature overnight. The excess acrylonitrile is removed under reduced pressure, and the residual oil is fractionated under reduced pressure to yield 3-(1-N,N-heptamethyleneimino)-propionitrile, B.P. 94–97°/0.9 mm. The latter is treated with lithium aluminum hydride according to the procedure given in Example 1 to yield the desired 3-(1-N,N-heptamethyleneimino)-propylamine.

Example 3

A solution of 5 g. of 2-(1-N,N-octamethyleneimino)-ethylamine in 7 ml. of water is treated with 4.1 g. of S-methyl-isothiourea sulfate. The reaction mixture is refluxed for 1½ hours, water is added to a total volume of 55 ml., and a solid material separates during the additional refluxing. It is filtered off after cooling and then recrystallized from water to yield 5.4 g. of 2-(1-N,N-octamethyleneimino)-ethyl-guanidine sulfate, M.P. 272–275° (decomposition).

The starting material used in the above reaction may be prepared according to the procedure given in Example 1 by reacting N,N-octamethyleneimine with chloroacetonitrile and converting the resulting nitrile compound to the 2-(1-N,N-octamethyleneimino)-ethylamine by treatment with lithium aluminum hydride.

Example 4

A mixture of 5 g. of 2-(1-N,N-hexamethyleneimino)-ethylamine and 4.9 g. of S-methyl-isothiourea sulfate in 10 ml. of water is refluxed for 7 hours with evolution of methyl mercaptan. The solution is then concentrated to dryness under reduced pressure and the resulting 2-(1-N,N-hexamethyleneimino)-ethyl-guanidine sulfate is purified by recrystallizing the residue from a mixture of ethanol and ethyl ether; M.P. 233–236° (decomposition); yield: 6.8 g.

The 2-(1-N,N-hexamethyleneimino)-ethyl-guanidine sulfate may be dissolved in water, the solution is filtered through a column containing a strong anion (hydroxy ion) exchange resin, such as described in U.S. Patent No. 2,591,573, particularly Amberlite CG 400 (OH−), and the eluate is evaporated to dryness to produce the free base, which, in an ethanol-ether solution, may be treated with an ether solution of hydrogen chloride to form the hydrochloride of 2-(1-N,N-hexamethyleneimino)-ethylguanidine. When treated with methyliodide, an acetone solution of the free base yields the desired 2-(1-N,N-hexamethyleneimino)-ethyl-guanidine methiodide.

The starting material may be prepared according to the procedure given in Example 1, i.e. by reacting N,N-hexamethyleneimine with chloroacetonitrile and reducing the resulting nitrile compound with lithium aluminum hydride to the desired 2-(1-N,N-hexamethyleneimino)-ethylamine.

Example 5

The reaction of 5 g. of 2-(1-N,N-pentamethyleneimino)-ethylamine in 7 ml. of water with 5.45 g. of S-methyl-isothiourea sulfate is initiated by slightly raising the temperature, is then maintained at room temperature and completed by heating. After cooling, the 2-(1-N,N-pentamethyleneimino)-ethyl-guanidine sulfate is filtered off and recrystallized from a mixture of ethanol and ethyl ether, M.P. 203–207° (decomposition); yield: 4.5 g.

By substituting in the above reaction 2-(1-N,N-tetramethyleneimino)-ethylamine for the 2-(1-N,N-pentamethyleneimino)-ethylamine and reacting the latter with S-methyl-isothiourea sulfate as shown, the 2-(1-N,N-tetramethyleneimino)-ethyl-guanidine sulfate may be obtained.

Example 6

To a solution of 2.5 g. of 2-(1-N,N-decamethyleneimino)-ethylamine in 5 ml. of water is added 1.76 g. of S-methyl-isothiourea sulfate, and the reaction mixture is heated on the steam bath for 4 hours. After cooling, the 2-(1-N,N-decamethyleneimino)-ethyl-guanidine sulfate is filtered off and recrystallized from ethanol, M.P. 260–273° (decomposition); yield: 2.3 g.

The starting material may be prepared according to the procedure described in Example 1, i.e. by treating N,N-decamethyleneimine with chloroacetonitrile and reacting the resulting nitrile compound with lithium aluminum hydride.

Example 7

A solution of 3.1 g. of N-[2-(1-N,N-heptamethyleneimino)-ethyl]-N-methylamine and 2.54 g. of S-methyl-isothiourea sulfate in 5 ml. of water is refluxed for four hours. 2.2 g. of crystalline 3-[2-(1-heptamethyleneimino)-ethyl]-3-methyl-guanidine sulfate precipitates and is recrystallized from a mixture of ethanol and water, M.P. 284–286° (decomposition).

The starting material may be prepared as follows: To a solution of 13.79 g. of N,N-heptamethyleneimine in 50 ml. of benzene is added 15.3 g. of 2-bromo-ethanol and 6.5 g. of sodium carbonate. The reaction mixture is stirred at room temperature during the addition and is then refluxed for seventeen hours. After cooling, filtering and evaporating the solvent, the remaining yellow oil is distilled to yield 14.78 g. of the colorless 2-(1-N,N-heptamethyleneimino)-ethanol, B.P. 110–115/14 mm.

A solution of 6.28 g. of 2-(1-N,N-heptamethyleneimino)-ethanol in 50 ml. of benzene is added to 5.2 g. of thionyl chloride in 150 ml. of benzene. The reaction mixture is refluxed for two hours while stirring; upon cooling a solid material separates, is filtered off and recrystallized from a mixture of methanol and ether to yield the 2-(1-N,N-heptamethyleneimine)-ethyl chloride hydrochloride, M.P. 204–205°; yield: 4 g.

10.22 g. of 2-(1-N,N-heptamethyleneimino)-ethyl chloride hydrochloride is added to 17.5 g. of a 33 percent ethanol solution of methylamine in the presence of 5.5 g. of anhydrous potassium carbonate. After refluxing for three hours, the reaction mixture is cooled, diluted with water and made strongly alkaline with 40 percent aqueous sodium hydroxide. The oily material is extracted with ether, the ether portion is dried over sodium sulfate, evaporated and the residue distilled. The colorless N-[2-1-N,N-heptamethyleneimino)-ethyl]-N-methylamine distills at 99–101°/13 mm., $n_D^{27}=1.4719$; yield: 3.1 g.

Instead of using methylamine other lower alkyl-amines, e.g. ethylamine or n-propylamine and the like, may be used in the preparation of the starting materials, which may be converted to 3-[2-(1-N,N-heptamethyleneimino)-ethyl]-3-lower alkyl-guanidine sulfates, such as, for example, 3-[2-(1-N,N-heptamethyleneimino)-ethyl]-3-ethylguanidine sulfate or 1-[2-(1-N,N-heptamethyleneimino)-ethyl]-3-n-propyl-guanidine sulfate.

*Example 8*

A mixture of 2.01 g. of 1-guanyl-3,5-dimethyl-pyrazole nitrate and 15.6 g. of 2-(1-N,N-heptamethyleneimino)-ethylamine is heated for 2½ hours while stirring. The excess amine is removed by distillation under reduced pressure, the residue is dissolved in water and converted to the desired 2-(1-N,N-heptamethyleneimino)-ethyl-guanidine sulfate by treatment with a strong anion (sulfate) exchange resin, such as Amberlite IRA 400 (SO$_4$⁻⁻), as described in U.S. Patent No. 2,591,573. The solution is evaporated under reduced pressure and the residue recrystallized from aqueous ethanol; the product is identical with the compound obtained according to the procedure of Example 1.

*Example 9*

A solution of 11.45 g. of 2-(1-N,N-heptamethyleneimino)-ethylamine dihydrochloride and 3.15 g. of cyanamide in 100 ml. of ethanol is refluxed for six hours. The solvent is removed under reduced pressure, the residue dissolved in water and converted to the 2-(1-N,N-heptamethyleneimino)-ethyl-guanidine sulfate with the help of a strong anion (sulfate) exchange resin as shown in Example 7.

*Example 10*

To a solution of 5 g. of 2-(1-N,N-heptamethyleneimino)-ethylamine in 10 ml. of water is added 4.5 g. of 1-methyl-S-methyl-isothiourea sulfate; the reaction mixture is heated on the steam bath and then worked up as shown in Example 1 to yield the desired 3-[2-(1-N,N-heptamethyleneimino)-ethyl]-1-methyl-guanidine sulfate.

*Example 11*

To a mixture of 1.46 g. of benzoyl-cyanamide and 1.56 g. of 2-(1-N,N-heptamethyleneimino)-ethylamine is added a small amount of concentrated aqueous hydrochloric acid; the mixture is heated on the steam bath for 10 to 15 minutes, then cooled and diluted with ethanol. Ether is added to precipitate the oily 1-benzoyl-3-[2-(1-N,N-heptamethyleneimino) - ethyl] - guanidine hydrochloride, which is separated by filtration. It shows a band at 1678 cm⁻¹ (in chloroform) in the infrared absorption spectrum.

Benzoyl-cyanamide may be replaced by (4-methoxy-benzoyl)-cyanamide or (3,4,5-trimethoxy-benzoyl)-cyanamide; when treated with 2-(1-N,N-heptamethyleneimino)-ethylamine as shown in the above example, these reagents yield the 3-[2-(1-N,N-heptamethyleneimino)-ethyl] - 1 - (4 - methoxy - benzoyl) - guanidine hydrochloride and 3-[2-(1-N,N-heptamethyleneimino)-ethyl]-1 - (3,4,5 - trimethoxy - benzoyl) - guanidine hydrochloride, respectively.

*Example 12*

A mixture of 2.35 g. of 2-(1-N,N-heptamethyleneimino)-ethyl-guanidine hydrochloride and 1 g. of propionyl chloride is heated in a sealed tube at 105° for several hours. After cooling the reaction mixture is dissolved in ethanol and the 3-[2-(1-N,N-heptamethyleneimino)-ethyl]-1-propionyl-guanidine hydrochloride is precipitated by adding ether.

*Example 13*

A mixture of 2.35 g. of 2-(1-N,N-heptamethyleneimino)-ethyl-guanidine hydrochloride and 0.8 g. of acetyl chloride, whenever treated according to the procedure of Example 12, yields the 1-acetyl-3-[2-(1-N,N-heptamethyleneimino)-ethyl]-guanidine hydrochloride.

*Example 14*

A solution of 3-(4-methyl-1-N,N-hexamethyleneimino)-propylamine in water, when treated with S-methyl-iso-thiourea as shown in Example 1, yields the 3-(4-methyl-1-N,N-hexamethyleneimino)-propyl-guanidine sulfate.

The starting material may be prepared by reacting 4-methyl-N,N-hexamethyleneimine with acrylonitrile in the presence of benzyl trimethylammonium hydroxide to form the 3-(4-methyl-1-N,N-hexamethyleneimino)-propionitrile (B.P. 126–130°/15 mm.), which is treated in an ether solution with lithium aluminum hydride to yield the desired 3-(4-methyl-1-N,N-hexamethyleneimino)-propylamine.

What is claimed is:

1. A member of the group consisting of compounds of the formula:

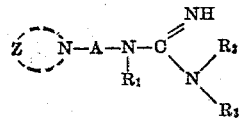

in which

represents N,N-alkylene-imino, the alkylene portion of which contains from four to ten carbon atoms, A stands for lower alkylene containing from one to five carbon atoms, R$_1$ represents a member of the group consisting of hydrogen and lower alkyl, R$_2$ represents a member of the group consisting of hydrogen, lower alkyl, lower alkanoyl, benzoyl and methoxy-substituted benzoyl, and R$_3$ stands for a member of the group consisting of hydrogen and lower alkyl, and therapeutically useful acid addition salts thereof.

2. Quaternary ammonium salts with lower alkyl halides of the compounds of the formula:

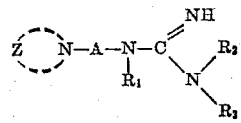

in which

represents N,N-alkyleneimino, the alkylene portion of which contains from four to ten carbon atoms, A stands for lower alkylene containing from one to five carbon atoms, R$_1$ represents a member of the group consisting of hydrogen and lower alkyl, R$_2$ represents a member of the group consisting of hydrogen, lower alkyl, lower alkanoyl, benzoyl and methoxy-substituted benzoyl, and R$_3$ stands for a member of the group consisting of hydrogen and lower alkyl.

3. Compounds of the formula:

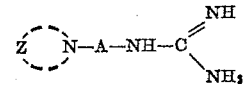

in which

represents N,N-alkyleneimino, the alkylene portion of which contains from five to eight carbon atoms and A represents an alkylene radical containing from two to three carbon atoms and separating the N,N-alkyleneimino portion from the guanidino group by from two to three carbon atoms.

4. (1 - N,N - heptamethyleneimino) - lower alkyl-guanidine, in which lower alkyl contains from two to three carbon atoms and separates the N,N-alkyleneimino portion from the guanidino group by from two to three carbon atoms.

5. 2 - (1 - N,N - heptamethyleneimino) - ethyl - guanidine.

6. 2-(1-N,N-heptamethyleneimino)-ethyl-guanidine sulfate.

7. 3-(1-N,N-heptamethyleneimino)-propyl-guanidine.

8. 2-(1-N,N-pentamethyleneimino)-ethyl-guanidine.

9. 2-(1-N,N-hexamethyleneimino)-ethyl-guanidine.

10. 2-(1-N,N-octamethyleneimino)-ethyl-guanidine.

No references cited.

UNITED STATES PATENT OFFICE

CERTIFICATE OF CORRECTION

Patent No. 2,928,829            March 15, 1960

Robert Paul Mull

It is hereby certified that error appears in the printed specification of the above numbered patent requiring correction and that the said Letters Patent should read as corrected below.

Column 2, line 9, after "monocarboxylic acids," insert -- lower cycloalkene monocarboxylic acids, --; column 3, line 54, for "discarboxylic" read -- dicarboxylic --; line 63, for "carboxylic" read -- carbocyclic --; column 5, line 3, for "The may" read -- They may --; column 7, line 8, for "-3,-dimethyl-" read -- -3,5-dimethyl- --; column 10, line 66, for "[2-1-N,N-" read -- [2-(1-N,N- --.

Signed and sealed this 10th day of January 1961.

(SEAL)

Attest:

KARL H. AXLINE
Attesting Officer

ROBERT C. WATSON
Commissioner of Patents